United States Patent
Bruggesser et al.

(10) Patent No.: US 10,422,273 B2
(45) Date of Patent: Sep. 24, 2019

(54) FRESH AIR SUPPLY DEVICE OF AN INTERNATIONAL COMBUSTION ENGINE

(71) Applicant: Mahle International GmbH, Stuttgart (DE)

(72) Inventors: Veit Bruggesser, Hildrizhausen (DE); Ivano Morgillo, Neuhutten (DE); Juergen Stehlig, Neckartenzlingen (DE); Oliver Fischer, Weinstadt-Beutelsbach (DE)

(73) Assignee: Mahle International GmbH, Stuttgart (DE)

( * ) Notice: Subject to any disclaimer, the term of this patent is extended or adjusted under 35 U.S.C. 154(b) by 241 days.

(21) Appl. No.: 14/174,829

(22) Filed: Feb. 6, 2014

(65) Prior Publication Data

US 2014/0216385 A1  Aug. 7, 2014

(30) Foreign Application Priority Data

Feb. 7, 2013  (DE) .................. 10 2013 202 056

(51) Int. Cl.
*F02B 29/04* (2006.01)
*F28F 9/02* (2006.01)
(Continued)

(52) U.S. Cl.
CPC ........ *F02B 29/0462* (2013.01); *F28D 7/1692* (2013.01); *F28F 1/126* (2013.01);
(Continued)

(58) Field of Classification Search
CPC ....... F02M 35/10144; F02M 35/10347; F02M 35/1034; F02M 35/1036; F02M 35/10242;
(Continued)

(56) References Cited

U.S. PATENT DOCUMENTS 4,452,216 A  6/1984  Patchen, II et al.
4,693,084 A  9/1987  Ahrens
(Continued)

FOREIGN PATENT DOCUMENTS

DE  19853455 A1  6/1999
DE  102006043526 A1  4/2007
(Continued)

OTHER PUBLICATIONS

English abstract for EP2302183.
English abstract for DE19853455.
EPA Search Report for P100A12002EP.
English Abstract for DE102009025282.
(Continued)

*Primary Examiner* — Lindsay M Low
*Assistant Examiner* — Omar Morales
(74) *Attorney, Agent, or Firm* — Fishman Stewart PLLC (57) ABSTRACT

A fresh air supply device for an internal combustion engine may include a suction module for conducting supercharged fresh air and a charge air cooler arranged in the suction module for cooling the supercharged fresh air. The suction module includes a housing with a charge air inlet for uncooled charge air and a charge air outlet for cooled charge air. The housing has a cooler shell, which may include the charge air inlet containing the charge air cooler and an assembly opening. With respect to a flow direction of the charge air the assembly opening may be arranged downstream of the charge air cooler and through which the charge air cooler is inserted into the cooler shell. The housing has a connecting shell, which includes the charge air outlet and which in the region of the assembly opening is attached to the cooler shell in an air-tight manner.

13 Claims, 5 Drawing Sheets

(51) Int. Cl.
*F28F 21/06* (2006.01)
*F28F 27/02* (2006.01)
*F28D 7/16* (2006.01)
*F28F 1/12* (2006.01)
*F02B 31/06* (2006.01)

(52) U.S. Cl.
CPC .......... *F28F 9/0258* (2013.01); *F28F 9/0268* (2013.01); *F28F 21/06* (2013.01); *F28F 27/02* (2013.01); *F02B 29/0475* (2013.01); *F02B 31/06* (2013.01); *F28F 2225/02* (2013.01); *F28F 2275/14* (2013.01); *Y02T 10/146* (2013.01)

(58) Field of Classification Search
CPC .. F02B 29/04; F02B 29/0475; F02B 29/0462; F28F 3/06; F28F 3/08; F28F 3/083; F28F 9/00; F28F 9/001; F28F 2009/004; F28F 9/0075; F28F 9/0202; F28F 9/0219; F28F 9/0224; F28F 2009/029; F28F 9/22; F28F 2009/222; F28F 2280/02; F28F 1/126; F28F 27/02; F28F 9/0258; F28F 2225/02; F28F 2275/14
USPC ......... 123/184.21, 184.61, 563; 165/67, 157, 165/213, 215, 250, 252, 80.3; 60/599
See application file for complete search history.

(56) References Cited

U.S. PATENT DOCUMENTS

| | | | | |
|---|---|---|---|---|
| 4,823,867 A | * | 4/1989 | Pollard | ................ F28D 9/0037 |
| | | | | 165/166 |
| 4,823,868 A | | 4/1989 | Neebel | |
| 2006/0048759 A1 | * | 3/2006 | Hendrix | ................ F28D 7/1684 |
| | | | | 123/563 |
| 2009/0064959 A1 | * | 3/2009 | Niakan | ................... F02B 27/00 |
| | | | | 123/184.53 |
| 2012/0285423 A1 | | 11/2012 | Nguyen | |

FOREIGN PATENT DOCUMENTS

| | | | | |
|---|---|---|---|---|
| DE | 102009025282 A1 | 12/2010 | | |
| DE | 102009055715 A1 | 6/2011 | | |
| EP | 0 079 217 A2 | * 5/1983 | | |
| EP | 0079217 A2 | 5/1983 | | |
| EP | 0343565 A2 | 11/1989 | | |
| EP | 2302183 A2 | 3/2011 | | |
| FR | 2855605 A1 | * 12/2004 | .......... F02B 29/0462 | |
| FR | 2908833 A1 | * 5/2008 | .......... F02B 29/0418 | |
| FR | 2923859 A1 | 5/2009 | | |
| FR | 2930022 A1 | * 10/2009 | .............. F28F 27/02 | |

OTHER PUBLICATIONS

English Abstract for DE102006043526A1.
English Abstract for FR2923859.

\* cited by examiner

FRESH AIR SUPPLY DEVICE OF AN INTERNATIONAL COMBUSTION ENGINE

CROSS-REFERENCE TO RELATED APPLICATIONS

This application claims priority to German Patent Application No. 10 2013 202 056.2, filed Feb. 7, 2013, the contents of which are hereby incorporated by reference in their entirety.

TECHNICAL FIELD

The present invention relates to a fresh air supply device for feeding fresh air to an internal combustion engine.

BACKGROUND

In the case of a supercharged internal combustion engine, the fresh air to be fed to the internal combustion engine is brought up to an elevated pressure level, for the purpose of which a suitable charging device is provided, for example in the form of a roots blower or in the form of a turbine, preferentially of an exhaust gas turbocharger. By supercharging the fresh air, i.e. through its compression, heating of the charge air thus formed takes place at the same time. For improving the combustion process and in particular for increasing the mass flow it is usual to arrange a charge air cooler downstream of a supercharging device in a fresh air supply device in order to cool the supercharged fresh air, i.e. the charge air.

For integrating such a charge air cooler in such a fresh air supply device, a charge air cooler with its housing can be inserted into an interruption of a charge air duct, so that the housing of the charge air cooler forms a portion of the charge air duct. It is likewise possible to insert the charge air cooler with its housing into an air suction module or suction module in brief, which follows the charge air duct at the end of the fresh air supply device on the engine side and from which the distribution of the charge air to the individual combustion chambers of the internal combustion engine takes place. In both cases, elaborate sealing measures are required in order to avoid leakages.

SUMMARY

The present invention deals with the problem of stating an improved embodiment for a fresh air system of the type mentioned at the outset, which is characterized in particular by a comparatively cost-effective realisability.

According to the invention, this problem is solved through the subject of the independent claims. Advantageous embodiments are subject of the dependent claims.

The invention is based on the general idea of forming a housing of the intake module through at least two housing shells, wherein a charge air cooler is inserted into one of the housing shells. The housing shell, which receives the charge air cooler, is described as cooler shell in the following. The other housing shell is described as connecting shell in the following. The housing comprises a charge air inlet for uncooled charge air and a charge air outlet for cooled charge air. The charge air inlet is integrated in the cooler shell, which comprises an assembly opening, through which the charge air cooler is inserted into the cooler shell. With the help of the connecting shell, the housing is closed off in such a manner that the charge air cooler is fixed in the housing. For this purpose, the connecting shell is attached to the cooler shell in the region of the assembly opening in an airtight manner. Through the proposal according to the invention the charge air cooler can be particularly easily inserted into the housing. In addition, a simple and thus cost-effective design can be selected for the charge air cooler. It is noteworthy that dividing of the housing for forming the cooler shell and the connecting shell is selected so that the charge air inlet is exclusively formed on the cooler shell, so that it can be formed undivided in its circumferential direction. Because of this, airtight connection to another component of the fresh air supply device, which feeds the supercharged fresh air to the suction module, is simplified. This component, for example, can be a compressor of an exhaust gas turbocharger or another supercharging device. The charge air outlet can likewise be arranged on the connecting shell or on the cooler shell as well in such a manner that it is undivided in circumferential direction and accordingly can be simply connected to a following component. Furthermore, the division of the housing can take place along a plane, as a result of which a tight connecting of the two shells is simplified. For example, a welding method, in particular friction welding or hot gas welding or infrared welding, theoretically also ultrasound welding, can be carried out particularly easily.

According to an advantageous embodiment, the charge air cooler can comprise a plurality of tubes running parallel to one another in their longitudinal direction and a plurality of cooling fins which are connected to the tubes in a heat-transferring manner, wherein an assembly direction, in which the charge air cooler is inserted through the assembly opening into the cooler shell runs perpendicularly to the longitudinal direction of the tubes. In other words, with respect to the longitudinal direction of the tubes, the charge air cooler is inserted transversely into the cooler shell. Since in the process only comparatively little plug-in travel is required, the effort for guiding and for maintaining tolerances is reduced.

In another advantageous embodiment, the cooler shell can comprise a push-in contour that is open towards the assembly opening in a region that is distal from the assembly opening, into which an externally located plug contour of the charge air cooler dips in the assembly direction when the charge air cooler is inserted. In this way, a type of labyrinth seal can be realised between the housing and the charge air cooler, which on this side obstructs a bypass flow for bypassing the charge air cooler within the housing. Receiving contour and plug contour in this case can interact like a tongue and groove connection, which is characterized by a simple geometry and efficient positively joined coupling. For example, the charge air cooler can comprise an end plate each on two sides facing away from one another, which are connected to externally located cooling fins in a heat-transferring manner. The respective plug contour of the charge air cooler in this case can be formed through an edge of such an end plate. In principle it can be adequate to realise such a positively joined coupling between receiving contour and plug contour on only one side of the charge air cooler, for example on a lower side or on an upper side of the charge air cooler. Preferred is an embodiment, in which such a positively joined coupling each is realised both on the lower side as well as on the upper side by means of a receiving contour and a plug contour.

According to another advantageous embodiment, the connecting shell can comprise a stop contour facing the assembly opening, on which a support contour of the charge air cooler comes to bear against the assembly direction. Through this design, the relative position of the charge air cooler is fixed in the housing through assembling the connecting shell on the cooler shell, at least with respect to the flow direction of the charge air cooler on the air side. The support contour can again be formed through an edge of an end plate of the charge air cooler. In principle it can be sufficient to realise such a support between stop contour and support contour on only one side, on the upper side or on the lower side of the charge air cooler. However, preferred is an embodiment in which such contact between stop contour and support contour is realised both on the upper side as well as on the lower side. The respective contact between stop contour and support contour can be simultaneously designed as a bypass seal in order to avoid a flow bypassing the charge air cooler in the housing.

In another advantageous embodiment, the cooler shell can enclose the charge air cooler in a circumferential direction on three sides, while the fourth side is arranged in the region of the assembly opening. Preferentially, the fourth side of the charge air cooler is still arranged within the assembly opening, so that the charge air cooler against the assembly direction does not protrude through the assembly opening over the cooler shell. Because of this, the cooler shell can be particularly easily equipped with high stiffness and stability, in order to close and fix the entire charge air cooler with adequate strength.

In another advantageous embodiment, the connecting shell can be in contact with the cooler shell via a tongue and groove connection. By means of such a tongue and groove connection, a particularly intensive sealing on the respective connection can be realised. At the same time, this produces a positively joined connection also transversely to the assembly direction, which can transmit relatively large forces. Practically, this tongue and groove connection can run around closed in the circumferential direction along the entire assembly opening. Optionally, a seal can be integrated in the tongue and groove connection. Additionally or alternatively, a welded connection can be provided in the region of the tongue and groove connection between connecting shell and cooler shell.

During the operation of the fresh air supply device, the charge pressure leads to a significant pressure increase also in the housing of the suction module, which can lead to a deformation of the housing blowing up or expanding the housing. Because of this, the fatigue strength of the housing is threatened on the one hand. On the other hand, a bypass on the air side for bypassing the charge air cooler can develop in the housing because of this.

In another advantageous embodiment, at least one tensile anchor can be integrally formed on the cooler shell on the onflow side. With respect to the flow direction of the charge air, this tensile anchor can be arranged in the region of an onflow side of the charge air cooler. The respective tensile anchor in this case connects two wall portions of the cooler shell, which are located opposite one another on the onflow side of the charge air cooler. In this way, forces which occur in the suction module during the operation can be better absorbed by the cooler shell and thus by the housing, as a result of which the housing or the suction module has increased stability. Thus, the cooler shell not only serves for accommodating the charge air cooler, but in connection with the respective tensile anchor, substantially contributes to the stability, in particular the dimensional stability of the housing or the suction module.

According to an advantageous further development, at least one tensile anchor can be configured on the onflow side as a guide blade for the charge air, wherein the respective guide blade extends curved in an inlet region of the cooler shell comprising the charge air inlet in such a manner that it redirects the charge air coming from the charge air inlet in the direction of the charge air cooler. In particular, at least one such guide blade can be configured so that it brings about a 90° redirecting of the charge air flow.

In another advantageous embodiment, at least one tensile anchor on the outflow side can be integrally formed on the connecting shell, which with respect to the flow direction of the charge air is arranged in the region of or on an outflow side of the charge air cooler. The respective tensile anchor in this case connects two wall portions of the connecting shell to one another, which are located opposite one another on the outflow side of the charge air cooler. In this way, absorption of forces, which can act within the suction module during the operation, can also take place via the connecting shell. Thus, the connecting shell not only serves for closing off the cooler shell, but in connection with the respective tensile anchor, substantially contributes to the stability, in particular to the dimensional stability of the housing or of the suction module. In particular, the suction module can thus be stabilised in the cooler shell on the onflow side and in the connecting shell on the outflow side via at least one tensile anchor each, as a result of which the housing makes an important contribution to the stability of the suction module.

In another advantageous embodiment, the charge air cooler can comprise an inlet connection for feeding in a coolant, which is formed through an inlet connector that is separate with respect to the charge air cooler and with respect to the suction module. This separate inlet connector can now project through an inlet passage opening formed in the housing of the suction module into an inlet opening formed on the charge air cooler. The inlet passage opening in this case is practically located on the cooler shell. The inlet opening of the charge air cooler preferentially opens into an inlet chamber or distribution chamber, from which a plurality of tubes of the charge air cooler emanate. Additionally or alternatively, the charge air cooler can comprise an outlet connection for discharging a coolant, which is formed by an inlet connector that is separate with respect to the charge air cooler and with respect to the suction module. This separate inlet connector can project through an outlet passage opening formed in the housing, preferentially in the cooler shell, into an outlet opening formed on the charge air cooler. Here, this outlet opening can open into an outlet chamber or collecting chamber of the charge air cooler, which is fluidically connected to a plurality of tubes. The inlet chamber and the outlet chamber can be arranged next to one another on the same side of the charge air cooler. On an opposite side of the charge air cooler distal from that a redirection chamber is then practically located, into which open on the one hand the tubes connected to the inlet chamber and on the other hand the tubes connected to the outlet chamber. Through the separate inlet connector and the separate outlet connector it is particularly easily possible to insert the charge air cooler into the cooler shell through the assembly opening. Practically, the mentioned connectors are only assembled following the inserting of the charge air cooler through the respective passage opening, so that they do not form an interfering contour when inserting the charge air cooler.

According to an advantageous further development, the inlet connector can comprise at least one seal which seals the inlet connector in the inlet opening against the charge air cooler, i.e. against the coolant. Additionally or alternatively, the inlet connector can also comprise a seal which seals the inlet connector in the inlet passage opening against the housing, i.e. against the charge air. Additionally or alternatively, the outlet connector can comprise a seal, which seals the outlet connector in the outlet opening against the charge air cooler, i.e. against the coolant. Additionally or alternatively, the outlet connector can comprise a seal, which seals the outlet connector in the outlet passage opening against the housing, i.e. against the charge air.

In another advantageous embodiment, a flap device can be attached to the connecting shell in the region of the charge air outlet. Such a flap device can comprise at least one flap for controlling a charge air flow for each of a plurality of combustion chambers of the internal combustion engine. Such flaps can for example be configured as tumble flaps or as swirl flaps. With the help of such a flap device, the scope of construction of the fresh air supply device is increased, as a result of which preassembly is simplified and the effort for assembling the fresh air supply to the flap device on the cylinder head of the internal combustion engine is reduced.

The cooler shell and the connecting shell are practically injection moulded parts, which are injection moulded from plastic.

At least the cooler shell can be intensively ribbed on its outside, as a result of which it has a high stiffness. In this way, comparatively large compressive forces can be absorbed in the housing.

According to another advantageous embodiment, the suction module, or the housing and thus the cooler shell and the connecting shell can be produced from plastic, while the charge air cooler is produced from metal. In particular, in the case of the charge air cooler, the tubes, the fins and the end plates as well as any caps that may be present for forming the abovementioned distribution chamber, collecting chamber and redirecting chamber are produced from metal. Here, light metals or metal alloys or light metal alloys are preferred.

The shells produced from plastic are practically fastened to one another via a welded connection, preferentially friction welding or vibration welding, wherein the desired gas tightness is realised at the same time.

In another advantageous embodiment, a main flow direction of the charge air in the charge air cooler can run parallel to the assembly direction, however be orientated opposite thereto.

In another embodiment, the cooler shell can comprise at least one fixing rib in a region that is distal from the assembly opening, which extends parallel to the longitudinal direction of the tubes, which rib projects opposite to the assembly direction and in the process projects into the charge air cooler between adjacent tubes. By way of such a fixing rib, the charge air cooler can be positioned in the housing comparatively easily. At the same time, a seal between charge air cooler and housing is achieved with the help of the respective fixing rib, which extends transversely to the main flow direction of the charge air in the suction module, in order to avoid a bypass on the air side, which makes possible bypassing the charge air cooler in the housing on the air side.

It is likewise possible, in principle, to also arrange at least one such fixing rib on the connecting shell, which then extends likewise parallel to the longitudinal direction of the tubes, but then projects in the assembly direction and projects into the charge air cooler between adjacent tubes.

In another embodiment, charge air inlet and charge air outlet can be arranged on the cooler shell so that the connecting shell ultimately only forms a closure for the assembly opening. In this case, the main flow direction of the charge air in the charge air cooler is orientated perpendicularly to the assembly direction.

In an advantageous design, the charge air inlet, the inlet connection and the outlet connection can be arranged next to one another on the same side of the housing or of the cooler shell. In this way, a line conducting for the charge air and the coolant is simplified.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

According to the FIGS. 1 to 8, a fresh air supply device 1, with the help of which fresh air can be fed to an internal combustion engine, comprises a suction module 2, with the help of which supercharged fresh air can be conducted. The suction module 2 thus has an adequate pressure stability for charge air. The suction module 2 is located at an end of the fresh air supply device 1 assigned to the internal combustion engine and is connected to a charge air duct on the inlet side, which leads to a supercharging device, in particular to a compressor of an exhaust gas turbocharger. In the suction module 2, a charge air cooler 3 is arranged, with the help of which the supercharged fresh air, i.e. the charge air can be cooled. The suction module 2 has a housing 4 or is formed by a housing 4. The housing 4 comprises a charge air inlet 5 for uncooled charge air and a charge air outlet 6 for cooled charge air.

The housing 4 comprises a cooler shell 7 and a connecting shell 8, which are assembled in a suitable manner, thus forming the housing 4. The housing 4 in the shown case is thus designed in two parts, so that it substantially only comprises the cooler shell 7 and the connecting shell 8.

The cooler shell 7 comprises the charge air inlet 5 and contains the charge air cooler 3. Furthermore, the cooler shell 7 comprises an assembly opening 9, which with respect to the flow direction of the charge air is arranged downstream of the charge air cooler 3. The assembly opening 9 is dimensioned so that the charge air cooler 3 can be inserted into the cooler shell 7 through the assembly opening 9. The connecting shell 8 in the embodiment of the FIGS. 1 to 7 comprises the charge air outlet 6. In addition, the connecting shell 8 is attached to the cooler shell 7 in the region of the assembly opening 9 in an air-tight manner. The charge air thus flows from the charge air inlet 5 within the cooler shell 7 as far as to the assembly opening 9 where it enters the connecting shell 8, leaving it via the charge air outlet 6.

Figure 2:
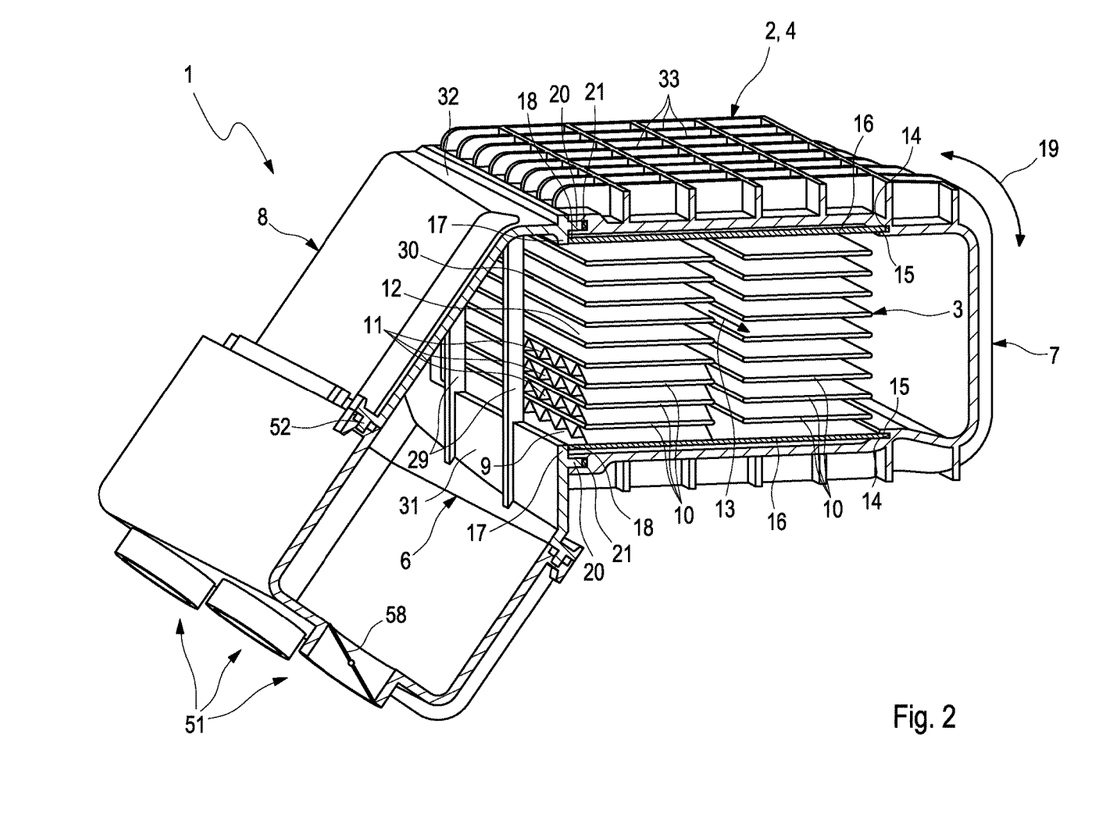
FIG. 2 an isometric sectional view of the fresh air supply device.

The charge air cooler 3 is designed as a tube-fin heat exchanger and comprises a plurality of tubes 10 running parallel to one another in their longitudinal direction. In addition to this, a plurality of cooling fins 11 which are only indicated in FIG. 2 are provided, which are connected to the tubes 10 in a heat-transferring manner. Practically, tubes 10 and cooling fins 11, alternating one another, are stacked onto one another. An assembly direction 12, which is indicated by an arrow for example in FIG. 2, in which the charge air cooler 3 can be inserted into the cooler shell 7 through the assembly opening 9 runs perpendicularly to the longitudinal direction of the tubes 10, which is indicated for example in FIG. 2 by an arrow 13.

Figure 3:
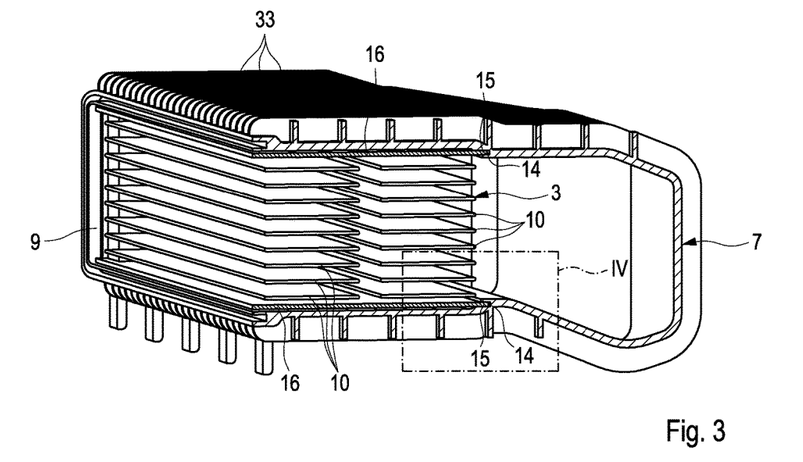
FIG. 3 an isometric sectional view of a cooler shell of the fresh air supply device, FIG. 4 an enlarged detail IV in FIG. 3, FIG. 5 another isometric sectional view of the cooler shell, FIG. 6 a further isometric sectional view of the cooler shell, FIG. 7 an enlarged detail VII from FIG. 6, FIG. 8 a greatly simplified sectional view of a further embodiment of the fresh air supply device.
Figure 4:
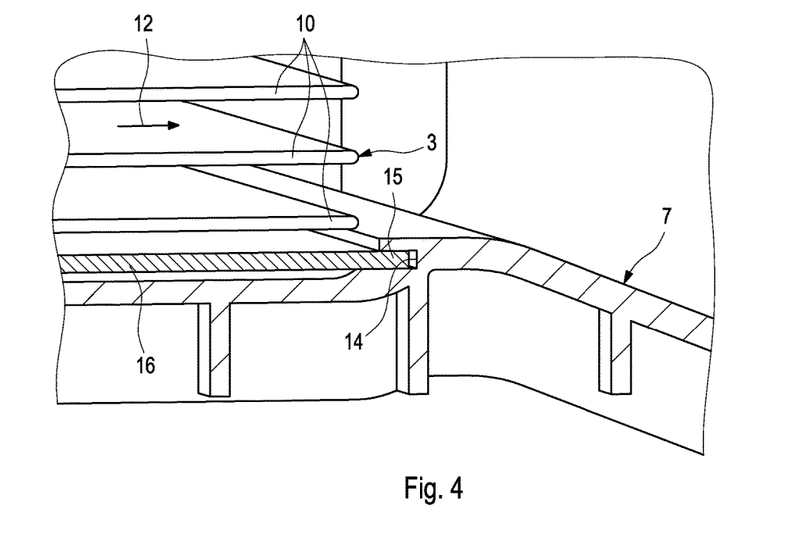

As is evident in the FIGS. 2 and 3 and in particular FIG. 4, the cooler shell 7 can comprise at least one receiving contour 14 in a region that is distal from the assembly opening 9, i.e. on an onflow side of the charge air cooler 3 on the air side, which is open towards the assembly opening 9. Practically, the charge air cooler 3 now comprises a plug contour 15 that is complementary to the receiving contour 14, which is located on the onflow side of the charge air cooler 3, so that it leads during the inserting of the charge air cooler 3 into the cooler shell 7. In the assembled state, the respective plug contour 15 dips into the associated receiving contour 14 in the assembly direction 12. The receiving contour 14 and the plug contour 15 in this case interact as a tongue and groove connection. The plug contour 15 is formed through an edge of an end plate 16 on the onflow side, which delimits a cooler block formed of the tubes 10 and the cooling fins 11 on two sides facing away from one another. Through the positively joined engagement between plug contour 15 and receiving contour 14 an efficient bypass seal is obtained, which obstructs a flow bypassing the charge air cooler 3 with respect to the charge air. Since in this case two such receiving contours 14 and plug contours 15 are present, a bypass seal for the charge air cooler 3 can be realised on both sides, i.e. on both end plates 16.

As is evident in particular from FIG. 2, the connecting shell 8 can comprise at least one stop contour 17, which faces the assembly opening 9. Following the inserting of the charge air cooler 3 into the cooler shell 7, the connecting shell 8 is attached to the cooler shell 7. In the process, the respective stop contour 17 comes to bear against the assembly direction 12 against a support contour 18 of the charge air cooler 3 that is complementary thereto. In the example, both the support contours 18 are each formed through an edge of the previously mentioned end plates 16 on the outflow side. Through the interaction of the stop contours 17 and the support contours 18, an intensive position fixing of the charge air cooler 3 within the housing 4 is obtained, which in particular can bring about a preloading of the charge air cooler 3 in the housing 4. The interaction of the respective stop contour 17 and the respective support structure 18 likewise brings about a bypass seal.

In the embodiments shown here the charge air cooler 3 is entirely arranged within the cooler shell 7, so that the cooler shell 7 encloses the charge air cooler 3 in a circumferential direction, which in FIG. 2 is indicated by a double arrow 19, on three sides. In FIG. 2, these are the upper side, the lower side and the right-hand side. In contrast with this, the fourth side, i.e. in FIG. 2 the left-hand side of the charge air cooler 3 is arranged in the assembly opening 9.

As is further evident from FIG. 2, the connecting shell 8 in this case is in contact with the cooler shell 7 via a tongue and groove connection 20. This tongue and groove connection 20 is embodied completely closed circumferentially along the assembly opening 9, in order to realise efficient sealing of the two shells 7, 8 on one another. The tongue and groove connection 20 also leads to an intensive stiffening of the housing 4 formed by the two shells 7, 8. In the region of the tongue and groove connection 20, in particular a welded connection between the two shells 7, 8 can be established. Optionally, a seal 21 can be arranged within the tongue and groove connection 20.

Figure 5:
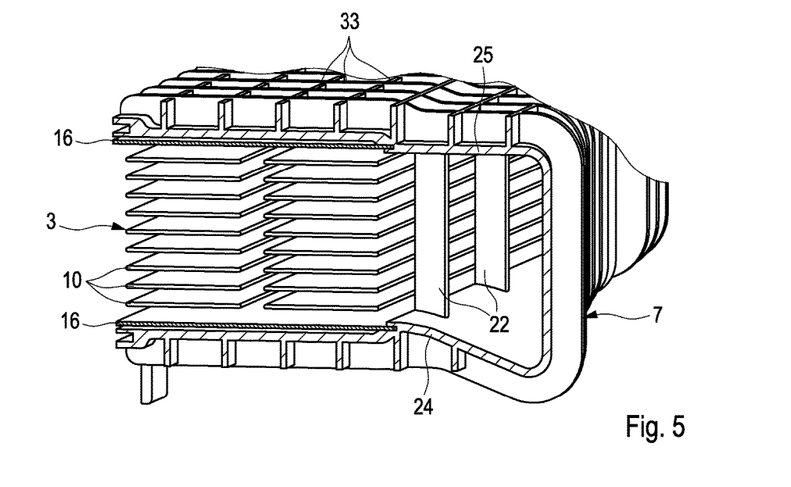
Figure 6:
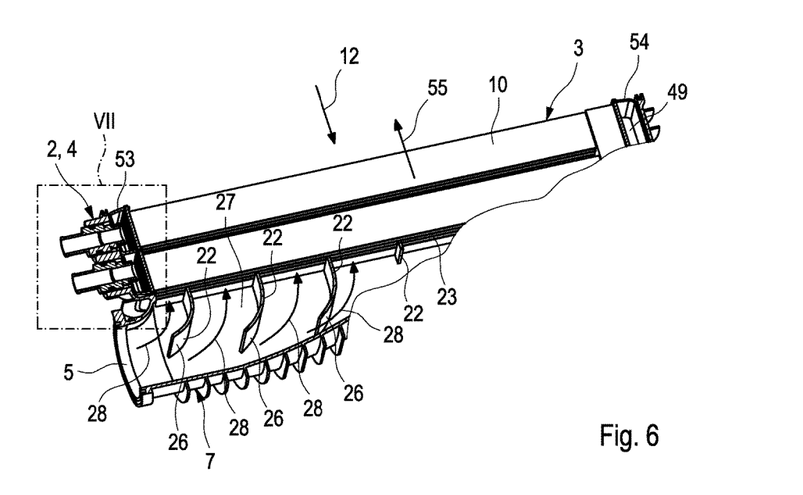

As is evident in particular from the FIGS. 5 and 6, a plurality of tensile anchors 22 can be arranged on the cooler shell 7 on the onflow side, which are practically formed integrally on the cooler shell 7. These tensile anchors 22 are arranged on an onflow side 23 of the charge air cooler 3 on the air side. Here, the tensile anchors 22 connect two wall portions 24, 25 of the cooler shell 7 to one another, which are located opposite one another on the onflow side 23 of the charge air cooler 3. As is evident from FIG. 6, some of these tensile anchors 22 can be configured as guide blades for the charge air on the onflow side. The respective guide blade in FIG. 6 is designated 26. It is curved and extends into an inlet region 27 of the cooler shell 7, which comprises the charge air inlet 5. The guide blades 26 in this case are curved so that here they bring about an approximately 90° redirection of the charge air coming from the charge air inlet 5 in the direction of the charge air cooler 3. Arrows 28 in this case indicate the charge air flow.

FIG. 2 indicates that tensile anchors 29 on the outflow side can also be present on the connecting shell 8, which can be practically formed integrally on the connecting shell 8. The respective tensile anchor 29 on the outflow side in this case is arranged with respect to the flow direction of the charge air on an outflow side 30 of the charge air cooler 3. Here, the respective tensile anchor 29 on the outflow side connects two wall portions 31, 32 of the connecting shell 8 to one another, which are located opposite one another on the outflow side 30 of the charge air cooler 3.

The tensile anchors 22 on the onflow side and the tensile anchors 29 on the outflow side lead to an intensive stiffening of the housing 4 on both sides of the charge air cooler 3. Compressive forces, which can develop within the charge air cooler 3 during the operation, can thus be absorbed by the housing 4. For stabilising the housing 4, it can be additionally provided that the cooler shell 7 on its outside is equipped with a multiplicity of stiffening ribs 33, which can run perpendicularly to one another and thus bring about intensive stiffening of the cooler shell 7.

Figure 7:
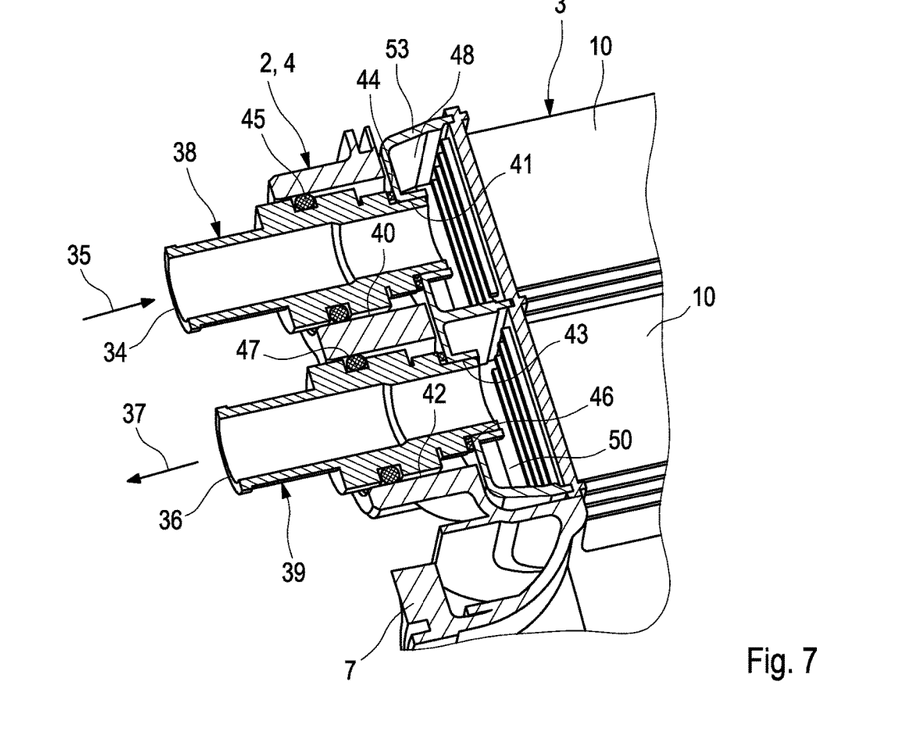

As is evident from the FIGS. 6 and 7, the charge air cooler 3 comprises an inlet connection 34 for feeding in a coolant according to an arrow 35. An outlet connection 36 for discharging the coolant according to an arrow 37 is likewise provided. The inlet connection 34 in this case is formed by an inlet connector 38, which with respect to the charge air cooler 3 and with respect to the suction module 2 forms a separate component. The outlet connection 36 in this case is also formed by a separate component, namely by an outlet connector 39. The inlet connector 38 is inserted into an inlet opening 41 of the charge air cooler 3 through an inlet passage opening 40 formed in the housing 4. The outlet connector 39 is inserted into an outlet opening 43 which is formed on the charge air cooler 3 through an outlet passage opening 42 formed in the housing 4. A first seal 44 on the inlet side seals the inlet connector 38 against the charge air cooler 3 in the region of the inlet opening 41. A second seal 45 on the inlet side seals the inlet connector 38 against the housing 4 in the region of the inlet passage opening 40. A first seal 46 on the outlet side seals the outlet connector 39 against the charge air cooler 3 in the region of the outlet opening 43. A second seal 47 on the outlet side seals the outlet connector 39 against the housing 4 in the region of the outlet passage opening 42. The respective first seal 44, 46 thus separates the coolant from the charge air. The respective second seal 45, 47 thus separates the charge air from the ambient air.

The inlet opening 41 opens into an inlet chamber 48 or distribution chamber 48, which is fluidically connected via a first group of tubes 10 to a redirection chamber 49 that is evident in FIG. 6. This redirection chamber 49 is then fluidically connected via a second group of tubes 10 to an upper chamber 50 or collecting chamber 50, into which the outlet opening 43 opens.

Figure 1:
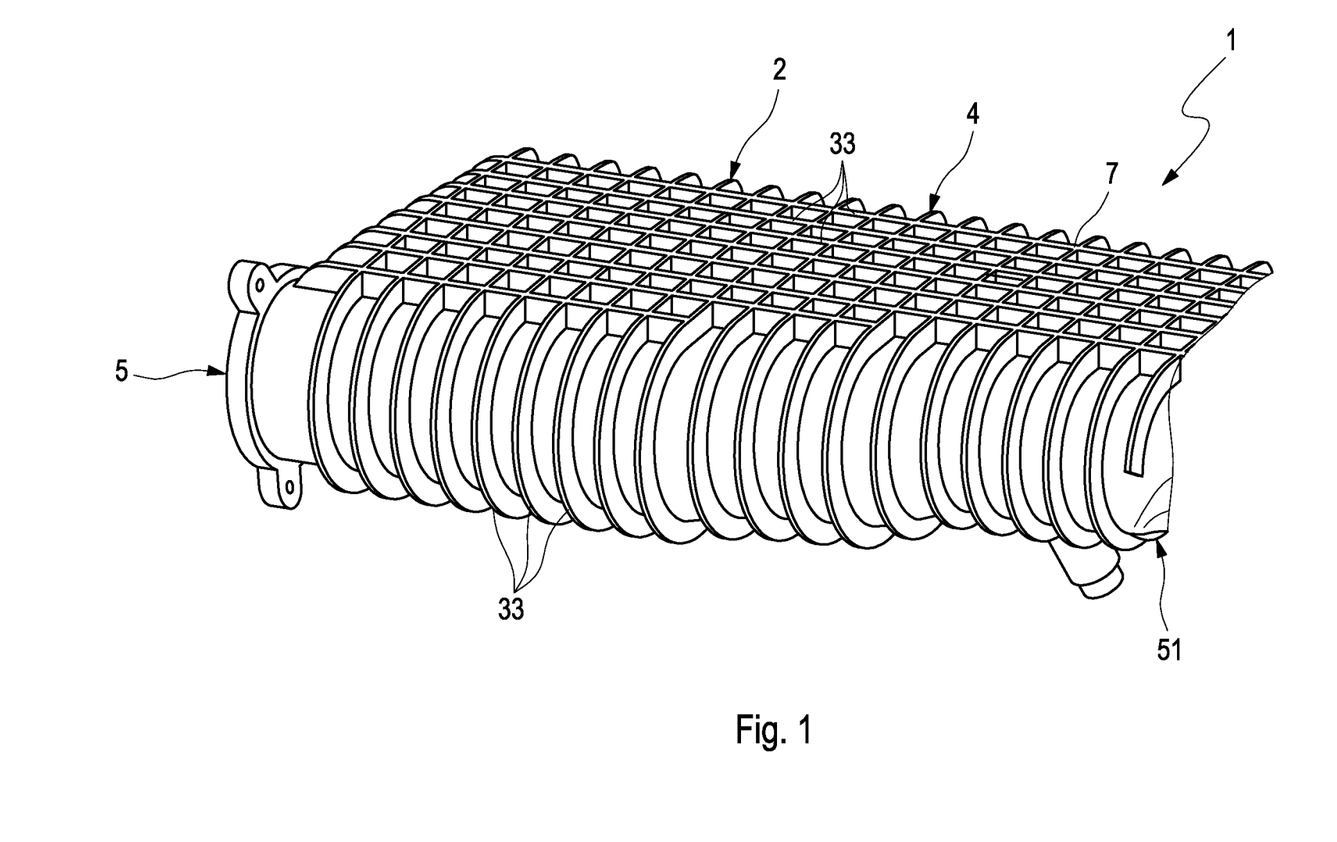
FIG. 1 an isometric view of a fresh air supply device.

As is evident from FIG. 1, the fresh air supply device 1 shown in the FIGS. 1 to 7 can be additionally equipped with a flap device 51, which is attached to the connecting shell 8 in the region of the charge outlet 6. The flap device 51 can be embodied as a tumble or swirl flap device. Corresponding flaps are marked with 58 in FIG. 2. Here, too, a completely closed circumferential tongue and groove connection 52 and/or a welded connection can again be provided along the charge air outlet 6 in order to connect the flap device 51 to the connecting shell 8 and thus to the housing 4 in an air and pressure-tight manner.

In the embodiment shown in the FIGS. 1 to 7, the connecting shell 7 serves for connecting the suction module 2 to a cylinder head of an internal combustion engine or for connecting to the flap device 51, which in turn is provided for connecting to the cylinder head.

The suction module 2 is produced from plastic. Accordingly, the housing 4 and consequently the cooler shell 7 and the connecting shell 8 are produced from plastic. The charge air cooler 3, by contrast, is produced from metal. In particular, the tubes 10, the fins 11 and the end plates 16 are thus produced from metal. Furthermore, a first cap 53 for realising the inlet chamber 48 and the outlet chamber 50 as well as a second cap 54 for realising the redirection chamber 49 can also be produced from metal. The connecting connectors 38, 39 can be preferably produced from plastic. In principle, however, metallic connecting connectors 38, 39 can also be used here.

In the embodiment shown in the FIGS. 1 to 7, the main flow direction of the charge air in the charge air cooler 3, which is indicated for example in FIG. 6 by an arrow 55, is orientated parallel to the assembly direction 12, however opposite thereto.

Figure 8:
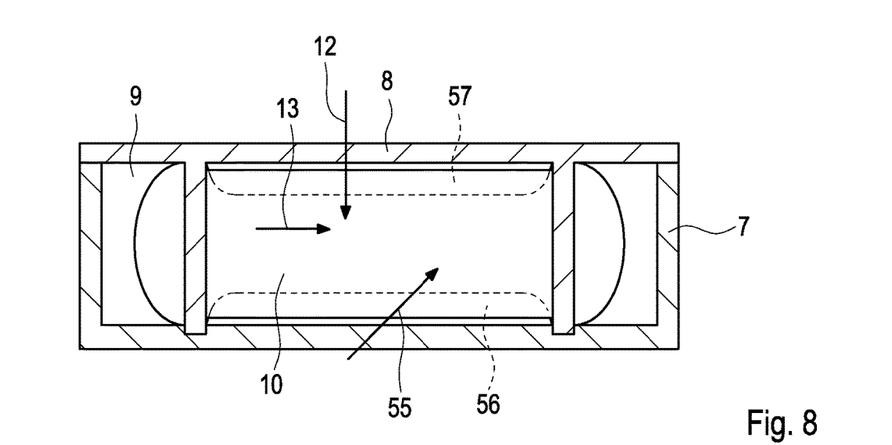

In contrast with this, FIG. 8 shows an embodiment in which the main flow direction 55 of the charge air is orientated perpendicularly to the assembly direction 12. In the embodiment shown in FIG. 8, the cooler shell 7, in a region that is distal from the assembly opening 9, comprises at least one fixing rib 56, which extends parallel to the longitudinal direction 13 of the tubes 10 and which projects from the cooler shell 7 opposite to the assembly direction 12. Here, the respective fixing rib 56 projects into the cooler block, namely into the charge air cooler 3 between two adjacent tubes 10. In the embodiment shown in FIG. 8, at least one such fixing rib 57 is likewise additionally provided on the connecting shell 8, which projects in the assembly direction 12 and likewise projects into the charge air cooler 3 between adjacent tubes 10. In the embodiment shown in FIG. 8, the charge air inlet 5 which is not shown and the charge air outlet 6 which is not shown are each arranged on the cooler shell 7.

The invention claimed is:

1. A fresh air supply device for an internal combustion engine, comprising:
   a suction module for conducting supercharged fresh air,
   a charge air cooler arranged in the suction module for cooling the supercharged fresh air,
   wherein the suction module includes a housing with a charge air inlet for uncooled charge air and a charge air outlet for cooled charge air,
   the housing includes a cooler shell, which includes the charge air inlet containing the charge air cooler and an assembly opening, which with respect to a flow direction of the charge air the assembly opening is arranged downstream of the charge air cooler and through which the charge air cooler is inserted into the cooler shell, and
   the housing has a connecting shell, which includes the charge air outlet and which in the region of the assembly opening is attached to the cooler shell in an air-tight manner,
   wherein the cooler shell in a region that is distal from the assembly opening includes at least one receiving contour that is open towards the assembly opening, into which a leading plug contour of the charge air cooler dips in the assembly direction when inserting the charge air cooler;
   wherein at least one tensile anchor is integrally formed on an onflow side of the cooler shell, which with respect to the flow direction of the charge air is arranged on an onflow side of the charge air cooler, the at least one tensile anchor connecting two wall portions located opposite one another on the onflow side of the charge air cooler;
   wherein the at least one tensile anchor is configured as a guide blade for the charge air, which extends curved in an inlet region having the charge air inlet and redirects charge air coming from the charge air inlet in the direction of the charge air cooler;
   wherein the connecting shell contacts the cooler shell via a tongue and groove connection;
   wherein the cooler shell encloses the charge air cooler in a circumferential direction on three sides, while a fourth side is arranged in the region of the assembly opening; and
   wherein in the region of the charge air outlet a flap device is attached to the connecting shell via a closed circumferential tongue and groove connection.

2. The device according to claim 1, wherein the charge air cooler includes a plurality of tubes which in their longitudinal direction run parallel to one another and a plurality of cooling fins which are connected to the tubes in a heat-transferring manner, wherein an assembly direction, in which the charge air cooler is inserted into the cooler shell through the assembly opening, runs perpendicularly to the longitudinal direction of the tubes.

3. The device according to claim 2, wherein at least one tensile anchor is integrally formed on an outflow side of the connecting shell, which with respect to the flow direction of the charge air is arranged on an outflow side of the charge air cooler, the at least one tensile anchor connecting two wall portions located opposite one another on the outflow side of the charge air cooler.

4. The device according to claim 2, wherein the main flow direction of the charge air in the charge air cooler runs parallel to and is oriented opposite of the assembly direction.

5. The device according to claim 4, wherein the cooler shell includes at least one fixing rib in a region that is distal from the assembly opening which extends parallel to the longitudinal direction of the tubes, the at least one fixing rib projecting opposite to the assembly direction and into the charge air cooler between adjacent tubes.

6. The device according to claim 2, wherein at least one of the charge air cooler includes an inlet connection for feeding in a coolant, the inlet connection formed by an inlet connector that is separate with respect to the charge air cooler and the suction module, the inlet connection projecting into an inlet opening formed on the charge air cooler through an inlet passage opening formed in the housing of the suction module, and the charge air cooler includes an outlet connection for discharging a coolant, the outlet connection formed by an outlet connector that is separate with respect to the charge air cooler and the suction module, the outlet connector projecting into an outlet opening formed on the charge air cooler through an outlet passage opening formed in the housing.

7. The device according to claim 1, wherein the connecting shell includes at least one stop contour facing the assembly opening, against which a support contour of the charge air cooler comes to bear opposite to the assembly direction.

8. The device according to claim 1, wherein on the connecting shell at least one tensile anchor is integrally formed on an outflow side, which with respect to the flow direction of the charge air is arranged on an outflow side of the charge air cooler, the at least one tensile anchor connecting two wall portions located opposite one another on the outflow side of the charge air cooler.

9. The device according to claim 1, wherein at least one of:
  (1) the charge air cooler includes an inlet connection for feeding in a coolant, the inlet connection formed by an inlet connector that is separate with respect to the charge air cooler and with respect to the suction module, the inlet connector projecting into an inlet opening formed on the charge air cooler through an inlet passage opening formed in the housing of the suction module; and
  (2) the charge air cooler includes an outlet connection for discharging a coolant, the outlet connection formed by an outlet connector that is separate with respect to the charge air cooler and with respect to the suction module, the outlet connector projecting into an outlet opening formed on the charge air cooler through an outlet passage opening formed in the housing.

10. The device according to claim 1, wherein at least one of the suction module is plastic and the charge air cooler is metal.

11. The device according to claim 1, wherein the main flow direction of the charge air in the charge air cooler runs parallel to the assembly direction, and is orientated opposite the assembly direction.

12. The device according to claim 1, wherein the cooler shell in a region that is distal from the assembly opening includes at least one fixing rib, which extends parallel to the longitudinal direction of the tubes and projects opposite to the assembly direction, the at least one fixing rib projects into the charge air cooler between adjacent tubes.

13. A fresh air supply device for an internal combustion engine, comprising:
  a suction module for conducting supercharged fresh air, the suction module including a housing with a charge air inlet for uncooled charge air and a charge air outlet for cooled charge air, and
  a charge air cooler arranged in the suction module for cooling the supercharged fresh air,
  wherein the housing includes a cooler shell, which includes the charge air inlet containing the charge air cooler and an assembly opening, which with respect to a flow direction of the charge air the assembly opening is arranged downstream of the charge air cooler and through which the charge air cooler is inserted into the cooler shell, and the housing has a connecting shell, which includes the charge air outlet and which in the region of the assembly opening is attached to the cooler shell in an air-tight manner,
  wherein the connecting shell contacts the cooler shell via a tongue and groove connection,
  wherein at least one tensile anchor is integrally formed on an outflow side of the connecting shell, which with respect to the flow direction of the charge air is arranged on an outflow side of the charge air cooler, the at least one tensile anchor connecting two wall portions located opposite one another on the outflow side of the charge air cooler,
  wherein at least one tensile anchor is integrally formed on an onflow side of the cooler shell, which with respect to the flow direction of the charge air is arranged on an onflow side of the charge air cooler, the at least one tensile anchor connecting two wall portions located opposite one another on the onflow side of the charge air cooler,
  wherein the at least one tensile anchor on the onflow side of the cooler shell is configured as a guide blade for the charge air, which extends curved in an inlet region having the charge air inlet and redirects charge air coming from the charge air inlet in the direction of the charge air cooler,
  wherein the cooler shell in a region that is distal from the assembly opening includes at least one receiving contour that is open towards the assembly opening, into which a leading plug contour of the charge air cooler dips in the assembly direction when inserting the charge air cooler,
  wherein the cooler shell encloses the charge air cooler in a circumferential direction on three sides, while a fourth side is arranged in the region of the assembly opening,
  wherein the cooler shell in a region that is distal from the assembly opening includes at least one fixing rib, which extends parallel to the longitudinal direction of the tubes and projects opposite to the assembly direction, the at least one fixing rib projects into the charge air cooler between adjacent tube, and
  wherein in the region of the charge air outlet a flap device is attached to the connecting shell via a closed circumferential tongue and groove connection.

* * * * *